(12) United States Patent
Barbosa et al.

(10) Patent No.: US 7,577,358 B2
(45) Date of Patent: Aug. 18, 2009

(54) APPARATUS, SYSTEM AND METHOD FOR OPTICAL PACKET SWITCHING USING FREQUENCY HEADER

(75) Inventors: Felipe Rudge Barbosa, Campinas (BR); Antonio de Campos Sachs, Campinas (BR); Mario Tosi Furtado, Campinas (BR)

(73) Assignee: Ericsson Telecomunicacoes S.A., Sao Paulo-SP (BR)

( * ) Notice: Subject to any disclaimer, the term of this patent is extended or adjusted under 35 U.S.C. 154(b) by 804 days.

(21) Appl. No.: 10/502,753

(22) PCT Filed: Jan. 30, 2002

(86) PCT No.: PCT/BR02/00015

§ 371 (c)(1),
(2), (4) Date: Jul. 28, 2004

(87) PCT Pub. No.: WO03/065758

PCT Pub. Date: Aug. 7, 2003

(65) Prior Publication Data

US 2005/0105906 A1     May 19, 2005

(51) Int. Cl.
*H04J 14/00* (2006.01)
(52) U.S. Cl. ............................ 398/54; 398/32; 398/51
(58) Field of Classification Search ................ 398/183, 398/187, 32, 51, 54, 76
See application file for complete search history.

(56) References Cited

U.S. PATENT DOCUMENTS 5,023,863 A * 6/1991 Masuda ..................... 398/47
5,253,250 A * 10/1993 Schlafer et al. ............. 370/392
RE34,676 E * 7/1994 Kuhn ......................... 398/183
5,568,303 A * 10/1996 Liedenbaum et al. ....... 398/182
5,612,806 A   3/1997 Su et al.

(Continued)

FOREIGN PATENT DOCUMENTS

EP     0 550 046     7/1993

(Continued)

OTHER PUBLICATIONS

S. Yao et al., Advances in Photonic Packet Switching: An Overview, IEEE Communications Magazine, Feb. 2000, pp. 84-94.

(Continued)

*Primary Examiner*—Christina Y Leung
(74) *Attorney, Agent, or Firm*—Nixon & Vanderhye P.C.

(57) ABSTRACT

In the present invention, a single-frequency tone is used as addressing header for each optical packet. The frequency of the single-frequency tone is situated within the baseband of the digital payload signal and is preferably a radio-frequency tone. The single-frequency tone is multiplexed with the digital payload and modulated into an envelope of an optical carrier. The frequency is indicative of an address or out-port for the optical packet, which means that different destinations in the network correspond to different frequencies. When switching such an optical packet, the power of the frequency tone is measured. If a tone is present, the optical path corresponding to the allocation is opened by an electronic switch control, and when the tone disappears, the path is closed. Due to the narrow bandwidth of the frequency tone, any disturbance of the digital payload is essentially negligible.

23 Claims, 7 Drawing Sheets

U.S. PATENT DOCUMENTS

| | | | |
|---|---|---|---|
| 5,892,606 A * | 4/1999 | Fatehi et al. | 398/181 |
| 6,594,049 B1 * | 7/2003 | Brinkman et al. | 398/49 |
| 6,600,581 B1 | 7/2003 | Fatehi et al. | |
| 6,671,079 B2 * | 12/2003 | Fuller et al. | 359/264 |
| 6,788,896 B1 * | 9/2004 | Wang et al. | 398/51 |
| 6,819,878 B1 * | 11/2004 | King et al. | 398/189 |
| 6,970,651 B1 * | 11/2005 | Schuster et al. | 398/131 |
| 7,039,316 B2 * | 5/2006 | Chang et al. | 398/51 |
| 7,142,553 B1 * | 11/2006 | Ojard et al. | 370/421 |
| 2001/0055136 A1 * | 12/2001 | Horiuchi et al. | 359/135 |
| 2002/0015210 A1 * | 2/2002 | Fuse | 359/182 |
| 2002/0074987 A1 * | 6/2002 | Hauptmann et al. | 324/76.12 |
| 2002/0131114 A1 * | 9/2002 | Yoo | 359/124 |
| 2002/0149824 A1 * | 10/2002 | Beaulieu et al. | 359/158 |
| 2002/0191251 A1 * | 12/2002 | Ferguson et al. | 359/139 |
| 2003/0067647 A1 * | 4/2003 | Wan et al. | 359/124 |
| 2003/0090767 A1 * | 5/2003 | Yap et al. | 359/181 |
| 2003/0133641 A1 * | 7/2003 | Yoo | 385/14 |
| 2006/0291870 A1 * | 12/2006 | Wan et al. | 398/183 |
| 2007/0133586 A1 * | 6/2007 | Ojard et al. | 370/421 |

FOREIGN PATENT DOCUMENTS

| | | |
|---|---|---|
| JP | A2001-148875 | 5/2001 |
| WO | WO 00/04668 | 1/2000 |

OTHER PUBLICATIONS

D. Blumenthal, Photonic Packets Switches: Architectures and Experimental Implementations, Proceedings of the IEEE, vol. 82, No. 11, Nov. 1994, pp. 1650-1667.

E. Park et al., Self-Routing of Wavelength Packets Using an All-Optical Wavelength Shifter and QPSK Subcarrier Routing Control Headers, IEEE Photonics Technology Letters, vol. 8, No. 7, Jul. 1996, pp. 938-940.

D. Wonglumsom et al., HORNET—A Packet-Switched WDM Network: Optical Packet Transmission and Recovery; IEEE Photonics Technology Letters, vol. 11, No. 12, Dec. 1999, pp. 1692-1694.

Translation of Japanese Official Action, Aug. 21, 2007, in corresponding Japanese Application No. 2003-565202.

* cited by examiner

APPARATUS, SYSTEM AND METHOD FOR OPTICAL PACKET SWITCHING USING FREQUENCY HEADER

This application is the US national phase of international application PCT/BR02/00015 filed 30 Jan. 2002 which designated the U.S., the entire content of which is hereby incorporated by reference.

TECHNICAL FIELD

The present invention relates generally to apparatuses, systems and methods for optical packet switching and in particular to optical packet switching using headers on sub-carriers.

BACKGROUND

It is expected that in the near future all-optical networks, where opto-electric conversion takes place at or near end points, will prevail. Such networks employ a "connectionless" approach having similarities with the principles of IP packet routing. A demand for efficient optical packets and optical packet switching naturally comes into scene. WDM networks have already provided important benefits of increased available bandwidth for point to point optical links. However, the processing capabilities of electronic switches and routers are expected to impose serious bottlenecks on future optical networks. Improved optical switching technology is the key issue for increasing the potential for implementing optical packet switched networks. Optical packet switching provides greater flexibility and easier management for the network, because data remains in the optical domain essentially from source to destination. Therefore, not only delays due to opto-electronic conversion and electronic processing are avoided at switching nodes, but also a complete transparency to data and format is attained. Photonic switching, not having to perform opto-electrical conversion of data content and discarding protocols and data format recognition, thus combines higher switching speed with greater effective bandwidths which are compatible with throughputs above Tb/s. Further issues still under investigation and development, include packet routing, flow control and contention resolution.

Overviews of recent advances in photonic packet switching may e.g. be found in "Advances in Photonic Packet Switching: an overview", by S. Yao and B. Mukherjee in IEEE Communic. Mag., pp. 84-94, February 2000 and in "Photonic Packet Switches Architectures and Experimental implementations" by D. J. Blumenthal, P. R. Prucnal and J. R. Sauer in Proceed. IEEE 82 (11), 1650 (1994).

Several solutions already exist, based on header and payload architecture for optical packets. Examples are found in e.g. "Self-routing of Wavelength Packets using All-Optical Wavelength Shifter and QPSK Sub-carrier Routing Headers" by E. Park and A. Willner in IEEE Photon. Tech. Lett. 8 (7), 938 (1996) and "HORNET—A Packet-Switched WDM Network: Optical Packet Transmission and Recovery" by D. Wonglumson, I. M. White, S. M. Gemelos and L. G. Kazovsky in IEEE Photon. Tech. Lett. 11 (12), 1692 (1999). The solutions differ mainly on whether the header is chosen in time, frequency, code or wavelength domain, or possible combinations.

In the published international patent application WO 00/04668, optical packets with data payload and separate header at a sub-carrier preceding the payload are used. However, problems may occur in this solution. As the optical packet propagates along the network a variable delay between header and payload may arise, which makes the switching procedures more difficult to perform. Moreover the header specifically occupies a frequency band above the payload baseband in order to avoid interference. When sub-carrier frequencies are as high as 10 GHz, the header may become severely attenuated due to fiber dispersion after tens of kilometers. This problem is recognized by the authors.

In the U.S. Pat. No. 5,253,250, an alternative solution is achieved by multiplexing a sub-carrier modulation (SCM) signal together with the payload signal. This is advantageous because payload and header experience the same light path and the same delays. The header sub-carriers occupy frequency bands above the payload baseband. Also here, header attenuation may result if the frequencies are too high. Moreover, devices for header processing have to be adapted to these higher frequencies, which may call for expensive and complex solutions. Since the general trend for the data transfer rate, and thereby the payload baseband, is to increase, sub-carrier frequencies which are possible to use today may in a short future be situated close to or even within the payload baseband. An optical network based on certain selected sub-carrier frequencies would then have to be re-designed in order to cope with higher payload frequencies.

When many nodes are being traversed, a necessity for acknowledgement signal may be implemented as in the U.S. Pat. No. 5,612,806. Also here, frequencies above the presently used payload baseband are used.

SUMMARY

A general object is thus to provide improved methods and devices for photonic packet switching. A further object is to provide a system, which can handle digital packets of any rate and size. Another object is to provide methods and devices for photonic packet switching, which are less expensive and less complex than the ones available today. Yet another object is to provide methods and devices which are easily applicable to metropolitan and access optical networks, comprising e.g. WDM networks.

The above objects are achieved by methods, systems and devices according to the enclosed patent claims. In general words, a single-frequency tone is used as addressing header for each optical packet. The frequency of the single-frequency tone is situated within the baseband of the digital payload signal and is preferably a radio-frequency tone. The single-frequency tone is multiplexed with the digital payload and modulated into an envelope of an optical carrier. The frequency is indicative of an address of the optical packet according to preestablished allocation relations, which means that different destinations in the network correspond to different frequencies. When switching such an optical packet, the power of the frequency tone is measured. If a tone is present, the optical path corresponding to the allocation is opened, and when the tone disappears, the path is closed. Due to the narrow bandwidth of the frequency tone, any disturbance of the digital payload is essentially negligible.

One clear advantage is that by using relative low frequencies, the header processing means can be implemented by simple technology, which reduces the overall complexity and cost. Furthermore, the invention is independent on future improvements in data transmission rates or formats. Also, optical packets of any size are automatically handled.

BRIEF DESCRIPTION OF THE DRAWINGS

FIG. 1b is a frequency diagram corresponding to a Fourier transform of the signals of FIG. 1a;

FIG. 6b is a schematic block diagram of one of the switching devices of FIG. 6a;

DETAILED DESCRIPTION

The technology has been developed having metropolitan and access optical networks in mind. The applicability is believed to be best for such types of applications. However, the general applicability of the technology is, however, not limited only to such networks, but is valid in all types of optical networks.

In the present disclosure, "switching" is used as a common name for any directing, switching and/or routing operations.

Figure 1A:
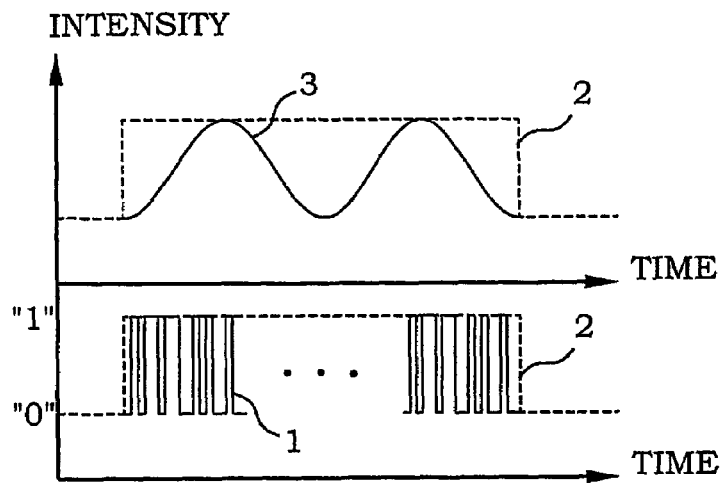
FIG. 1a is a diagram of a digital signal and a single-frequency tone.

An optical packet is basically an optical pulse of a certain duration transmitted on an optical carrier. The optical carrier is typically characterized by a fixed light wavelength. In FIG. 1a, two optical packets of optical signals are illustrated in a time diagram. The lowest portion of FIG. 1a illustrates a digital signal 1, where the intensity of the signal in an ideal case only assumes zero or full amplitude, representing a "0" and "1", respectively. The data transmission rate of such a signal is determined by the minimum possible duration of such digit signals. The extension of the total digital signal is limited by an envelope 2, in this case a time frame. In a practical case, the square shape of the "digits" is not perfect. In order to produce a usable signal, frequency components within a certain baseband have to be used. A broader baseband allows for a better representation of rapidly changing digital signals and thereby allows a higher data transmission rate.

In the upper part of FIG. 1a, an optical packet comprising a single-frequency tone 3 is illustrated. This tone comprises ideally one single well-determined frequency. The frequency tone is unmodulated. The single-frequency tone 3 thus presents a pure sinusoidal shape.

Figure 1B:
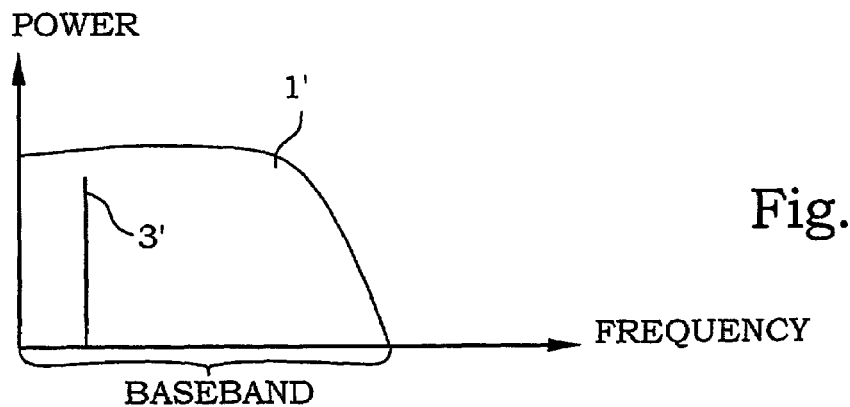

The signals illustrated in FIG. 1a can also be represented in the frequency space, as powers of the corresponding Fourier transform. The digital signal is in FIG. 1b represented by a power distribution 1' of frequencies. The width of the distribution is defined as the baseband bandwidth spanned by the digital signal. In the same way, the single-frequency tone of FIG. 1a can be represented in frequency space. The single-frequency tone will here in a theoretical case appear as a spike 3'. However, the limitation of the time duration of the time frame and other causes will in reality give the spike 3' a certain width, corresponding to an uncertainty in the frequency.

Note that the diagrams only illustrate the main principles and the actual shapes are not mathematically correct.

Figure 2:
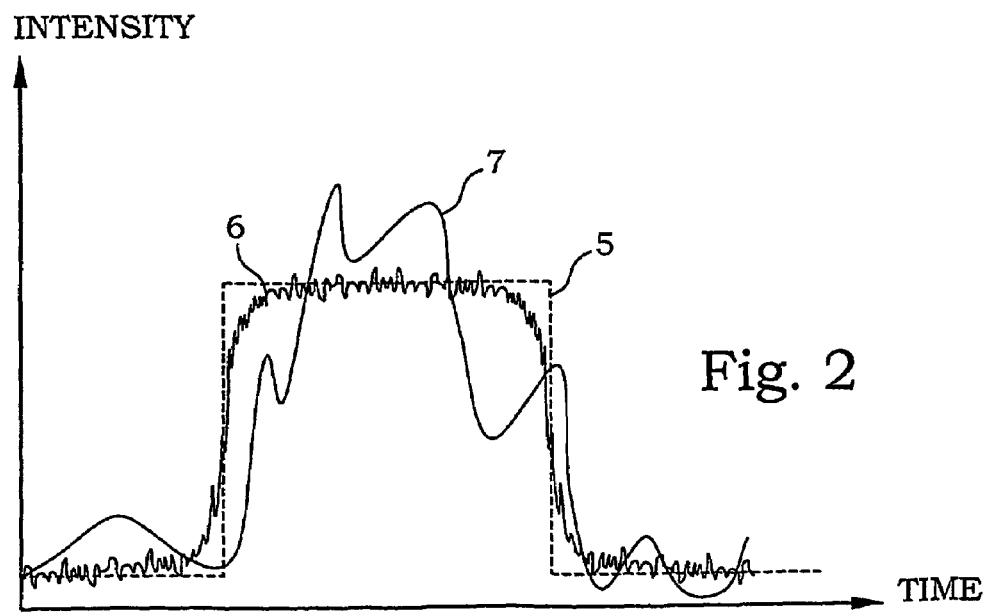
FIG. 2 is a schematic diagram of a digital signal with different degrees of disturbances.

In FIG. 2, one digital step is illustrated. The broken line 5 illustrates the ideal behavior of the digital signal. In practice, however, the available frequency baseband is limited, and a signal corresponding to the full line 6 may be a typical example. The onset time of the digit is still relatively well defined. However, if a disturbance occurs, the situation may be changed. By e.g. multiplexing a signal with a relatively broad bandwidth with the signal, the information content in the corresponding frequencies of the digital signal is strongly deteriorated. The result may e.g. be the dotted curve 7. In such a case, the onset time of the digital signal is not any more well defined, and a "1" may be mistaken for a "0". A bit error occurs. This is one of the reasons why modulated header signals are usually not allowed to assume frequency values within the digital payload baseband.

In the technology described below, the digital signal is also indeed disturbed. However, a single-frequency tone is multiplexed with the digital signal. This means that the corresponding frequency in the frequency distribution representing the digital signal is changed. However, the lost information is very limited, and the resulting digital signal will not be changed be very much. With a narrow enough frequency distribution, the increased uncertainty of the digital signal becomes negligible, still being within the specification concerning bit rate errors of optical packets.

A single-frequency tone, since it is unmodulated, does not contain any information besides its amplitude, phase and frequency. The phase of a certain frequency component is very difficult to control and obtain in practice, and since the amplitude can be superimposed by the corresponding frequency components of the digital signal, the frequency is the only property that can be used for carrying information. However, in a well-defined system, a certain frequency value can be connected to a certain information, in particular header information according to preestablished relations. The most appropriate header information for optical packets is the address or routing information of the packet, whereby the preestablished relations are constituted by allocation relations, preferably in an allocation table.

Figure 3A:
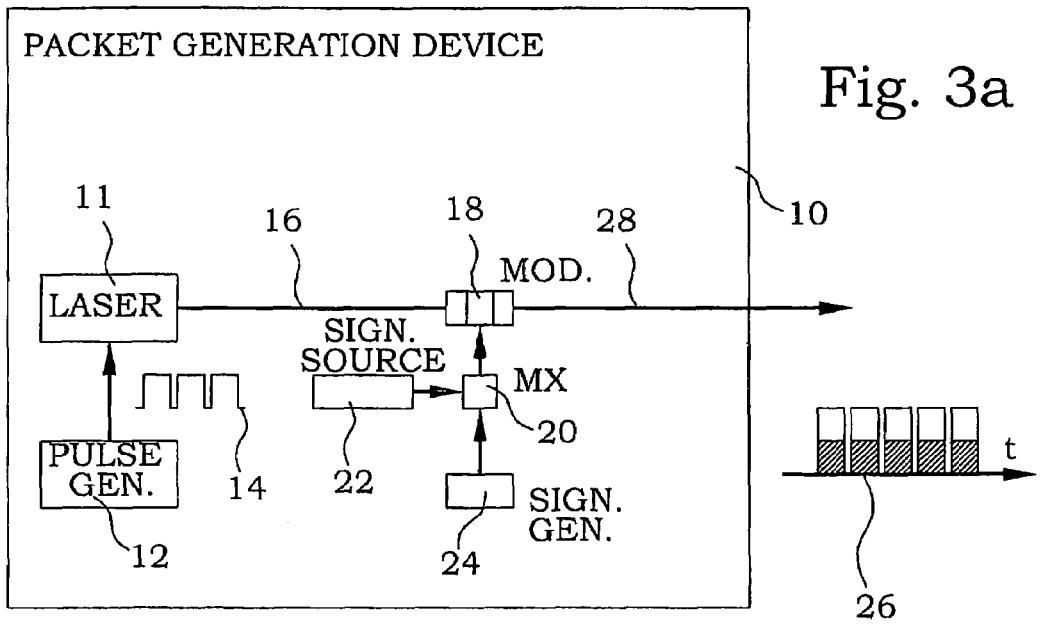
FIG. 3a is an example embodiment of an optical packet generation device.

An example embodiment of a packet generation device 10 is illustrated in FIG. 3a. A single-mode laser source 11 provides laser light of a predetermined wavelength. This predetermined wavelength constitutes an optical carrier for the signals in the present embodiment. A pulse generator 12, providing a square pulse directly modulates the laser current. The resulting laser signal 14 thus comprises packet envelopes or time frames of certain well-defined duration. A typical choice of packet duration may be between 2 and 2.8 µs, and a packet separation could be e.g. 0.5 µs. However, other combinations are also possible. For instance, when a burst of information occurs in the network, it can be treated as a sequence of packets separated by a time interval less than a certain value, say 0.3 µs, so that the switching fabric sees it as a single "long" packet occupying the switch. The time frame on the optical carrier is provided onto an optical fiber 16, and transmitted to an optical modulator 18.

A source 22 of the digital signal to be transported provides the digital signal to a multiplexor 20, in which the digital signal is multiplexed with a single-frequency tone, supplied by a signal generator 24. The multiplexed signal is then provided to the optical modulator 18, which will modulate the optical carrier wavelength with the combined signal, comprised in the packet envelope or time frame. The optical modulator 18 can be of various construction technologies, such as a lithium niobate ($LiNbO_3$) electro-optical modulator, or an acousto-optical modulator, or an electro-absorption modulator, which are available in prior art. The optical modulator 18 must have a frequency response bandwidth compatible with the highest frequency to be applied onto the optical carrier signal. In the present embodiment, the digital signal has the highest bandwidth, since the sub-carrier frequency selected for the header information is situated inside the baseband of the digital signal. The header frequency tone is preferably located in the lower radio-frequency spectrum and most preferably below 50 MHz. This is a choice related to the low cost and easy access of parts and components in this frequency range, as well as simplicity of electronic circuit design and implementation. Preferably, the header frequency tone has a combined frequency linewidth and uncertainty less than or equal to 10 kHz. An optical packet 26 comprising the digital payload and the analogue frequency tone is transmitted onto an exit optical fiber 28

Figure 3B:
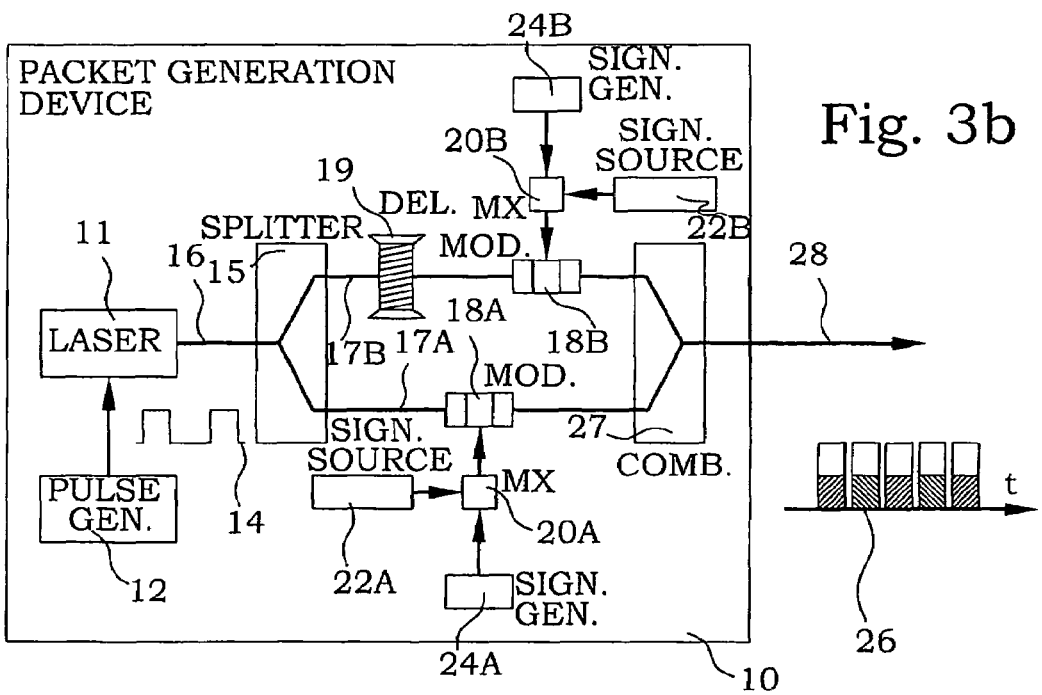
FIG. 3b is another example embodiment of an optical packet generation device, giving two time-multiplexed sets of optical packets.

FIG. 3b illustrates another example embodiment of a packet generation device. In this embodiment, two sets of digital signals are time multiplexed onto the same optical fiber. Similar components are denoted by the same reference numbers and are not described again. In this embodiment, the pulse generator 12 has a signal shape that creates time frames on the optical carrier, with a larger separation than duration. In a preferred case, the time frame duration is 2 µs, while the separation is 3 µs. The generated optical time frames are transmitted into a beam splitter 15, where the light is divided into two parallel optical fibers 17A, 17B. One of the fibers 17A are connected to an optical modulator 18A, controlled by multiplexor 20A, provided with signals from a digital signal source 22A and a frequency signal generator 24A analogue to the previous embodiment. The other fiber 17B is connected to another set of an optical modulator 18B, a multiplexor 20B, a digital signal source 22B and a frequency signal generator 24B via a fiber delay line 19. The fiber delay line delays the optical packet for a period somewhat longer than the time frame duration. In the present examples, a delay of 2.5 µs would be appropriate. The modulated signals from the optical modulators 18A and 18B are combined into one common optical signal in a combiner 27. Due to the delay of one of the optical branches, the digital signals from the sources 22A and 22B are time multiplexed after each other at the common exit optical fiber 28, with a separation of 0.5 µs.

Anyone skilled in the art now realizes that any number of parallel digital signal streams can be time multiplexed in a similar manner using appropriate number of branched optical fibers, where each branch has a specified delay. It is also possible to perform the delay action after the modulated signal is modulated onto the optical carrier, and it can be performed in one or several steps. More than two different frequency packets can thus be generated by adding larger splitting ratios and more delay lines. Optical packets with different digital content and different address headers, having frequencies $f_1, f_2, \ldots f_k$, are formed and sent through the network nodes connected thereto.

Figure 8:
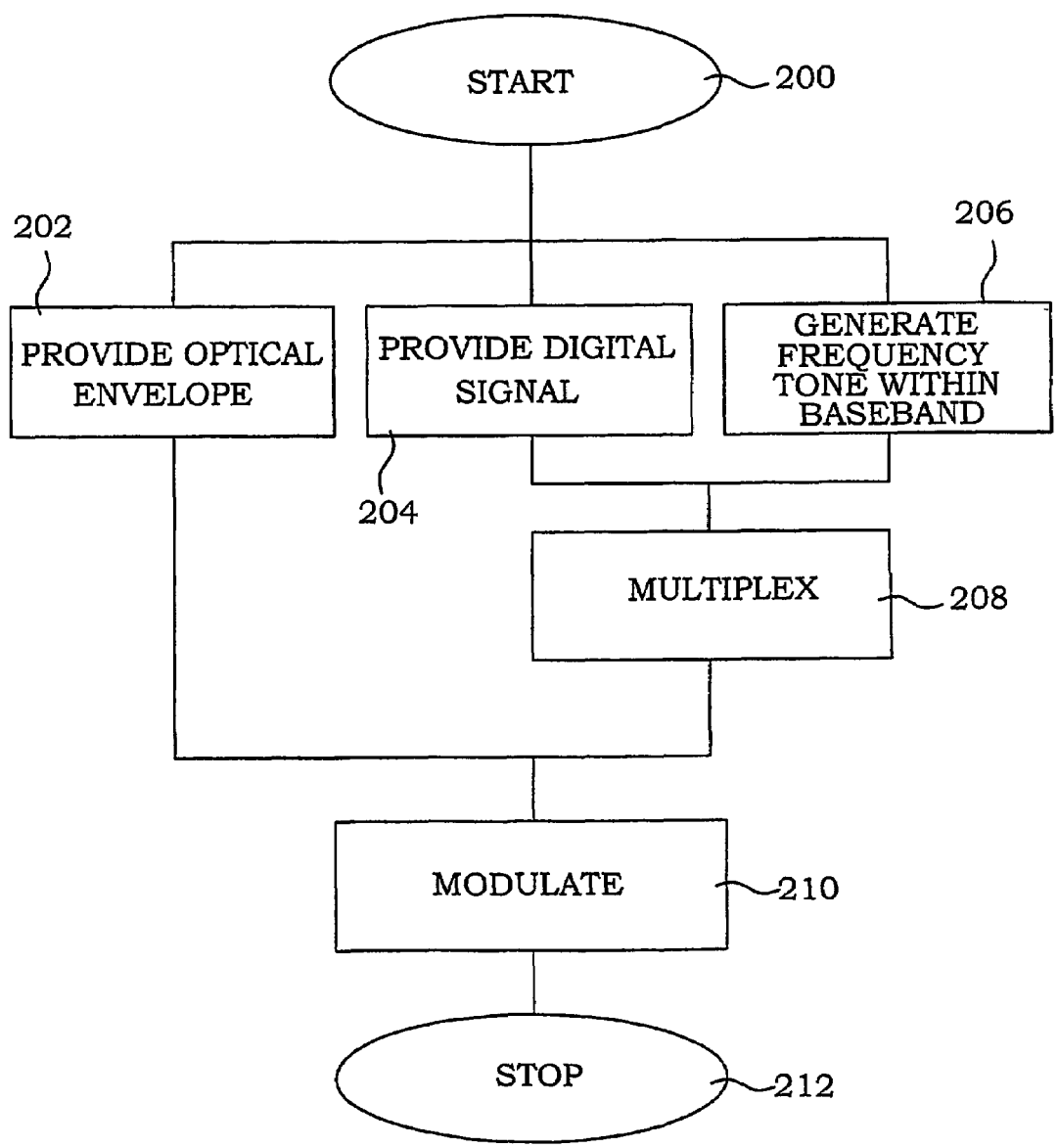
FIG. 8 is a flow diagram illustrating an example optical packet generation method.

FIG. 8 presents a flow diagram illustrating an example generation method. The procedure starts in step 200. In step 202, an envelope on an optical carrier is provided. A digital payload signal is provided in step 204 and a single-frequency tone within the baseband of the digital payload signal is generated in step 206. The digital signal and the single-frequency tone are multiplexed in step 208 and the resulting signal is modulated onto the optical envelope in step 210. The procedure ends in step 212.

Optical packets comprising single-frequency tones within the digital payload baseband as address flags or header information are thus created and sent out on an optical network.

Figure 4:
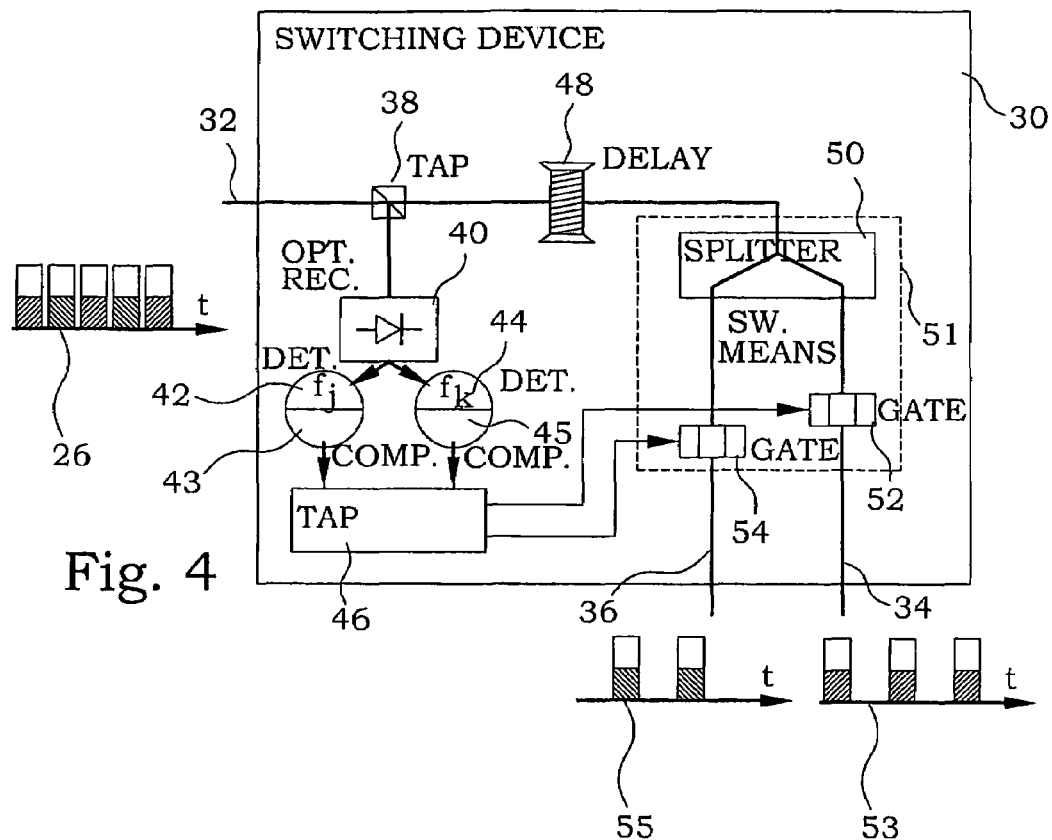
FIG. 4 is an example embodiment of an optical packet switching device, having one in-port and two out-ports.

FIG. 4 illustrates an example embodiment of a switching device 30 performing switching actions on such generated optical packets. In the presently illustrated embodiment, the switching device 30 has one in-port 32 and two out-ports 34, 36, in order to facilitate the description of the underlying principles. However, switching devices with any number of ports are possible to create. The in-ports 32 and out-ports 34, 36 are input and output terminals, respectively, of the switching device.

An optical packet 26 is received at the in-port 32. At an optical tap 38 extracts a part or a fraction of the power of the optical signal, which extracted part is supplied to an optical receiver 40. In the optical receiver 40, the optical signal is converted into an electronic signal. The electronic signal is provided as input signal to two header recognition units. Preferably, a pre-amplification of the electronic signal is performed by a pre-amplifier either at the output of the optical receiver 40, as a separate unit or at the input side of the header recognition units.

The first header recognition unit comprises a power detecting means 42, which senses the power within a certain predetermined frequency window $f_j$. Preferably, the power detecting means 42 comprises a bandpass filter having a very narrow bandwidth. In order to be practically usable, the bandwidth should be less than 100 kHz and preferably less than 10 kHz. The total power contained in the signal resulting from the filtering is than a good measure of the intensity of that particular frequency component. This signal is preferably amplified before further used.

If the detected power is high enough, e.g. upon comparison in a comparator 43 with a predetermined threshold, it may be concluded that an additional single-frequency tone of frequency $f_j$ as present in the original optical packet. In such a case, the header recognition means provides an electronic switch control 46 with a signal demanding it to perform a suitable switching action. When the power falls below the threshold, i.e. when the frequency tone $f_j$ disappears, the electronic switch control 46 is instructed to close the previous path.

The second header recognition unit has a similar design, with a power detecting means 44 and a comparator 45, but is toned into another frequency $f_k$. The electronic switch control 46 is thereby informed about any presence of a frequency signal of $f_j$ or $f_k$. The switching device 30 is designed with two out-ports 34, 36. The out-port 34 is associated with the frequency $f_j$ and the out-port 36 is associated with the frequency $f_k$. An optical packet having a frequency tone of $f_j$ is thus intended for the out-port 34 and an optical packet having a frequency tone of $f_k$ is similarly intended for the out-port 36. The main optical signal, i.e. the part of the optical signal that is not tapped at the optical tap 38 is provided to a switching means 51 via a fiber delay line 48. The fiber delay line 48 is used for adapting the optical packet timing, as described further below. The switching means 51 comprises in this embodiment a beam splitter 50 or branching means, which divides the incoming optical signal into two branches. Each of the branches are connected to a respective out-port 34, 36, via a respective optical gate 52, 54. When the gate 52 is open, the light is transmitted onto the out-port 34 and when the gate 54 is open, light is transmitted onto the out-port 36. The optical gates 52, 54 are connected to and controlled by the electronic switch control 46.

When a frequency component of frequency $f_j$ is strong enough, the electronic switch control 46 opens the optical gate 52 and the optical packet is allowed to reach out-port 34. When a frequency component of frequency $f_k$ is strong enough, the electronic switch control 46 opens the optical gate 54 and the optical packet is allowed to reach out-port 36. A switching action is thus performed directly on the information carried by the frequency of the added single-frequency tone in connection with allocation information, which in the present invention preferably is provided in the electronic switch control 46. Output signals 53 and 55 are transmitted from the out-ports 34 and 36, respectively. The digital payload itself is left essentially unaffected, and is not processed or converted at any time in the switching and routing process.

Since any digital payload will have some power also at the frequencies selected for the header addresses, the threshold of the header recognition means has to be larger than zero. However, since the disturbance of the frequency tone is reduced with reduced power, it is also requested to keep the frequency tone power as low as possible. In test systems, one has found that single-frequency tones having an amplitude of 15% of the digital payload intensity will be enough for allowing a detection of the tones. However, improved filtering techniques may lower this figure in the future.

Figure 9:
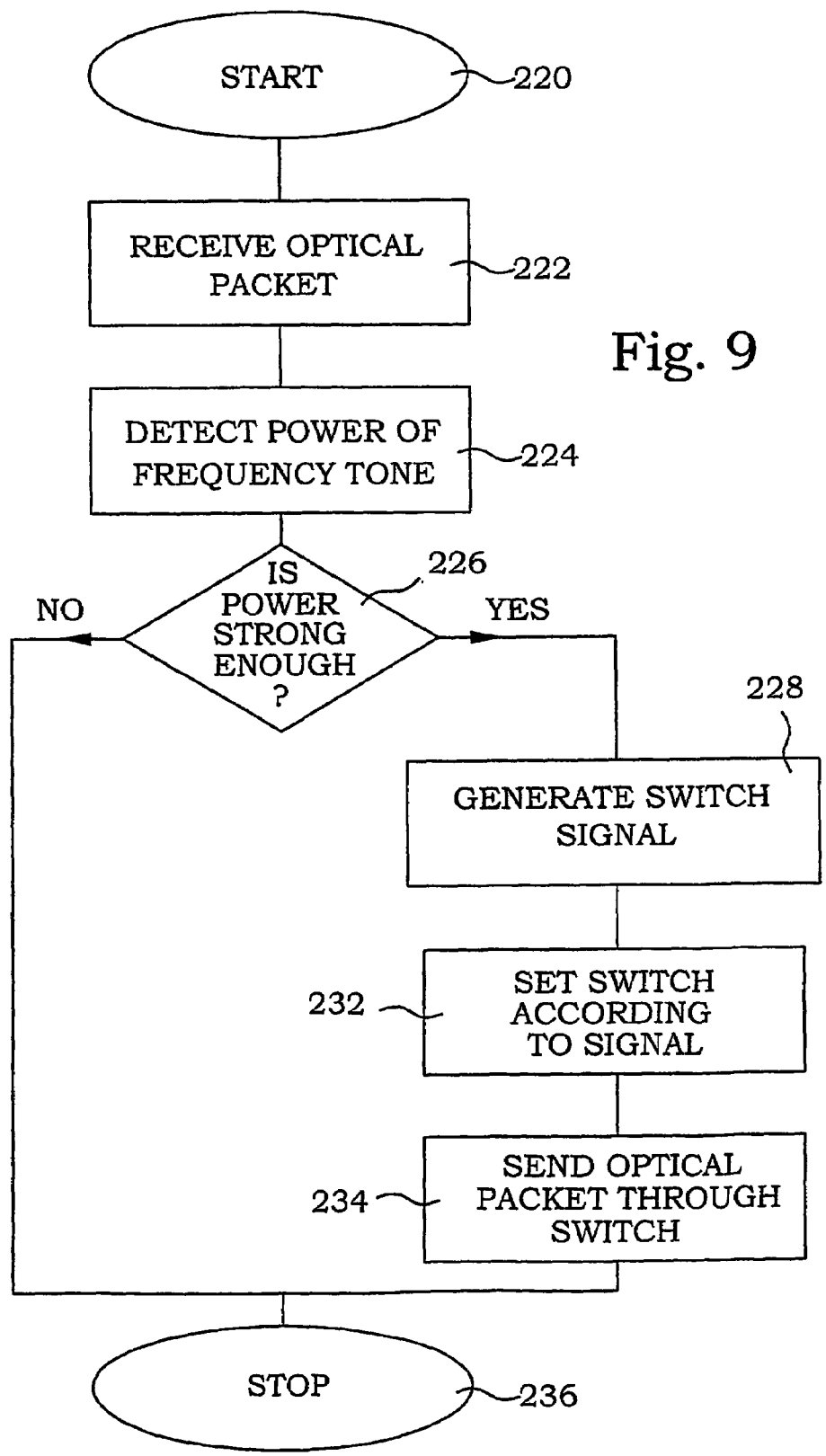
FIG. 9 is a flow diagram illustrating an example optical packet switching method.

FIG. 9 presents a flow diagram illustrating an example switching method. The procedure starts in step 220. In step 222, an optical packet on an optical carrier is received at an in-port of an optical switch. The power of a certain predetermined frequency component or tone is detected in step 224. In step 226, it is evaluated if the power is high enough, i.e. the tone is strong enough for a header frequency. If that is the case, the process continues with step 228, where a switching signal for causing a certain optical path through the switch is generated. In step 232, the switch is set according to the switch signal, i.e. the switch selects a certain out-port if the predetermined frequency tone is present, but closes the switch path if the predetermined frequency is missing or is too low. The optical packet is then sent through the switch in step 234. The procedure ends in step 236. If, on the other hand, the power is found to be low in step 226, the process continues directly to step 236.

Figure 5:
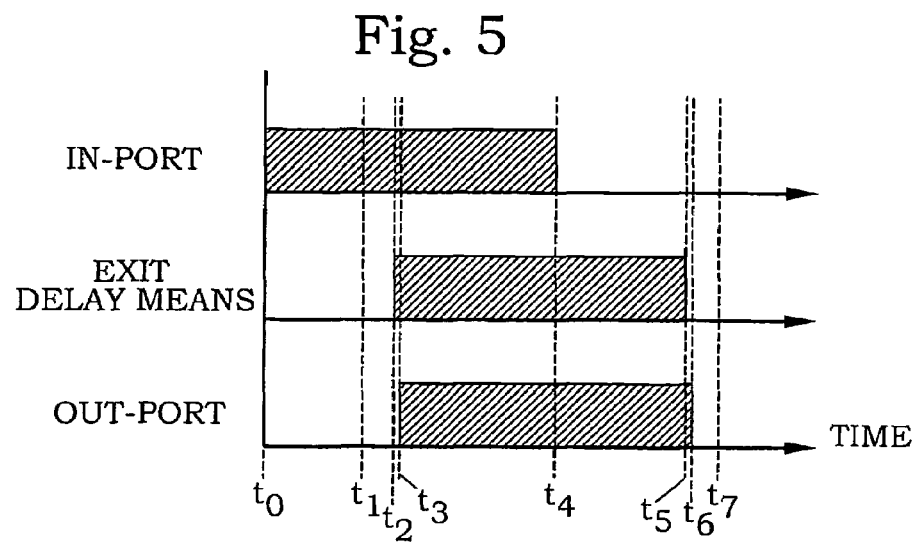
FIG. 5 is a time diagram illustrating example timing of an optical packet passing an optical switch.

The timing of the switching action is important. Since static storage of optical packets is troublesome, optical switching is typically performed "on-the-fly". Since there is need for some processing time to evaluate the header information of an optical packet and to carry through the actual switching, the optical packet has to be delayed. Similar procedures are also known in prior art switches. The delay line is precisely synchronized with the processing time added of the guard times at beginning and end of packet frame. The guard time ensures that no part of the information content of the optical packet is lost in the switching process. The guard time can be of any prescribed value, being suitable values fractions between 2 and 5% of the envelope frame. FIG. 5 illustrates the optical packet timing on its way through the switching device. Three positions within the switching device are represented by one time axis each. The upper one is the timing of the arrival at the in-port, the middle one represents the output from the delay line and the lower one represents the timing of the exit from the out-port.

An optical packet arrives at the in-port at time $t_0$. The optical packet header is evaluated, i.e. the existence of a frequency tone is investigated. When there is a tone present, the switching takes place. This processing time and switching time is finished at time $t_1$. In the meantime, the optical packet has entered the delay line. The delay time is adapted to the processing time, i.e. $t_1-t_0$, and a start guard time is also added. The optical packet exits the delay line at $t_2$, i.e. the delay time is $t_2-t_0$ and the start guard time is subsequently $t_2-t_1$. The front of the optical packet is transmitted through the actual switching unit and exits from the out-port at time $t_3$.

The end of the optical packet arrives at the in-port at time $t_4$. This also means that the header frequency tone disappears. A header processing and a switching off action are performed. However, in order to be sure that the entire optical packet has passed the switch, an extra delay of the actual switching action is introduced. The length of the optical packet is $t_4-t_0$, and consequently, the end of the optical packet exits the delay line at time $t_5=t_2+t_4-t_0$. The time $t_5$ corresponds to the time $t_4$ plus the processing time and the start delay time. After passing the switch, the optical packet leaves the switch at time $t_6$. The switch is now ready to close. By adding an end guard time the closing of the switch occurs at time $t_7$. The end guard time, i.e. $t_7-t_5$ should be chosen to be longer than the travelling time for the optical packet through the switch unit plus the time for the actual switching operation.

Figure 6A:
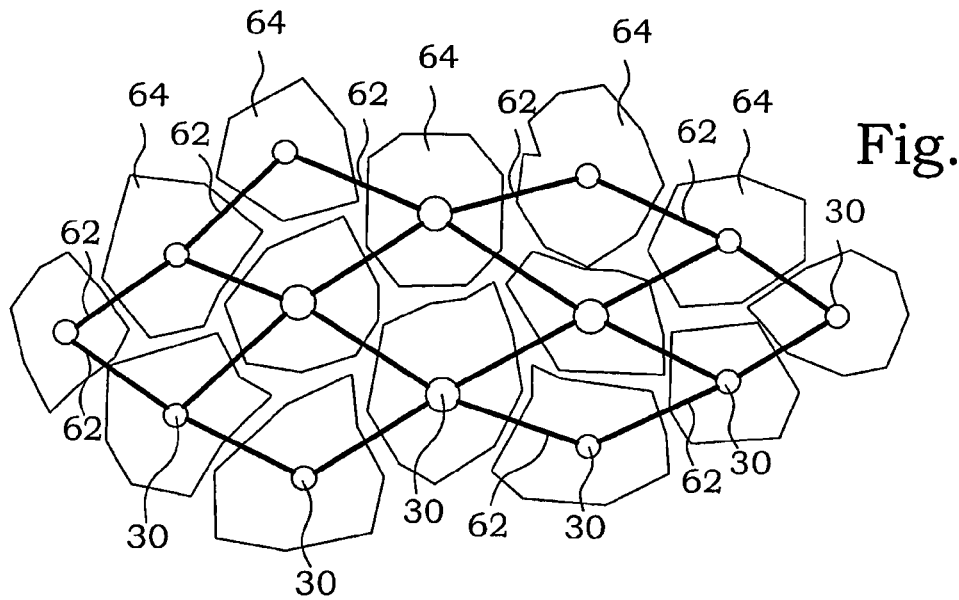
FIG. 6a is a schematic block diagram of an example optical network.

The switching device may be preferably implemented in metropolitan and access optical networks, which may span areas several kilometers wide, and interconnecting fixed communications or wireless communications stations or terminals. Although nodes in the network are assumed equivalent to each other, a situation occurs when a node is elected to be interconnection to other networks, similar to or different than what has been described in this invention, thus becoming a "higher" node. In such elected higher node, besides having all described functions, may perform opto-electric conversion and generate new optical packets. FIG. 6a illustrates schematically an optical network 60 comprising a number of switching devices 30 according to the present invention. Each switching device 30 is associated with a local access network 64. The switching devices 30 are interconnected by network links 62, in this embodiment unidirectional communication. Bi-directional communication can be achieved with a counterpropagating overlay network. Network nodes have preferably 2×2 configuration with add-drop functionality implemented as in FIG. 6b, described more in detail further below. At network edge lower nodes may have one in-port and one out-port, besides add-drop ports. An add port is defined as an in-port not otherwise connected to the network, through which packets may enter the network. A drop port is similarly defined as an out-port not otherwise connected to the network, through which packets which are leaving said network may exit the network. Other configurations, such as multiple input and output ports can be easily realized as combined stages following the principles presented here. For instance, 3×3 or 4×4 nodes can be achieved with a combination of two-stage switching device 30, interconnecting properly out-ports of first stage with in-ports of second stage.

Figure 6B:
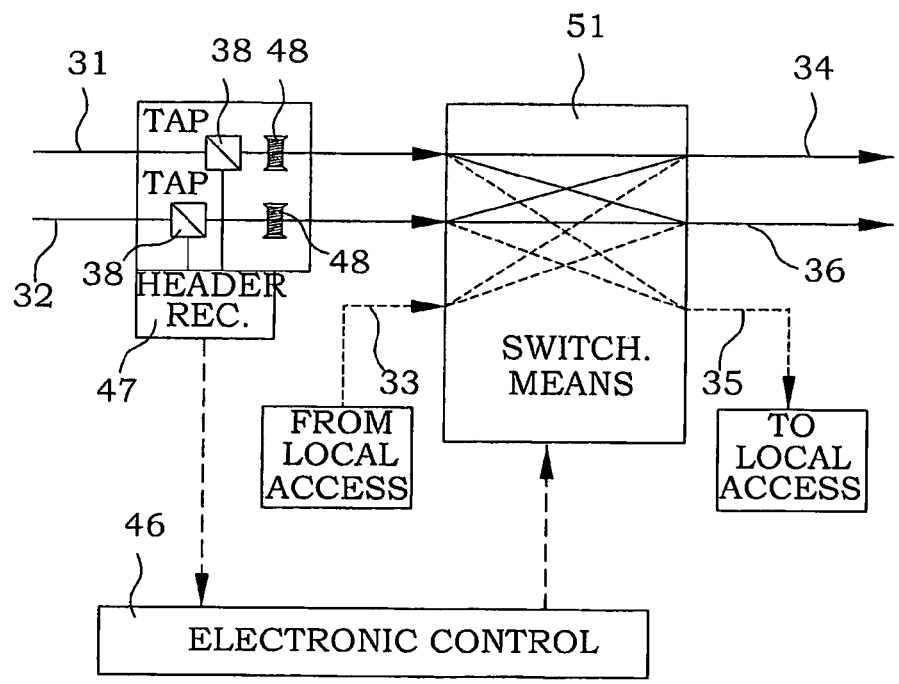

FIG. 6b illustrates an embodiment of a node structure used in the network of FIG. 6a. The switching device 30 of this embodiment has two regular in-ports 31, 32 and two regular out-ports 34, 36. Additionally, the switching device 30 has an add port 33 and a drop port 35, connected to a local access. A header recognition means 47 is here used as a common unit for devices necessary for the header recognition, e.g. means corresponding to 40, 42-45 in FIG. 4.

The routing of optical packets through the network can be performed according to a number of different approaches. If the network is small, having short transmission times from one switching device to another, a centralized approach may be used. This is advantageous for establishing priorities and for dealing with bursts of information. When an optical packet enters, or a collection of packets having the same frequency header, and possibly having a burst structure as described previously, enters the network, the header is evaluated and suitable switch control signals are produced for all switches at the same time. This means that the network operates as one distributed switching device.

A more flexible approach, however, is to perform header recognition at each switch instead, following the packet by packet switching procedure already described. By natural extension of such procedure, several frequency tones can be recognized by using several switch control units as 42-43-46 and 44-45-46 in FIG. 4, one for each frequency, and organizing such frequencies as groups allocated to either out-port, according to a pre-established allocation table. For instance, if one has six frequencies $f_1$ to $f_6$, then $f_1$, $f_3$ and $f_5$ can go to out-port No. 1, and $f_2$, $f_4$ and $f_6$ can go to out-port No. 2. It is clear that any of these frequencies may be added or dropped at a node in a similar manner. Furthermore, if very narrow frequency tones are used, the addition of more than one frequency tone will give acceptable bit error rate. By adding more than one frequency tone, not only the final destination but also a path through the network can be established. This may allow also network protection mechanisms to be implemented.

The use of multiple single-tone headers can also be used for other purposes than defining a switching path. Even if the destination address is the most useful header information, other information may be interesting from time to time. Since network design always results in situations where contention resolution is needed, information of e.g. the priority of the optical packets may be useful in different applications. By adding a frequency tone to the packet, which frequency tone is associated with e.g. a high priority, the packet can be treated in a high-prioritized manner when contention situations arises.

As anyone skilled in the art understands, other header information can also be represented by the existence of single frequency tones.

Figure 7:
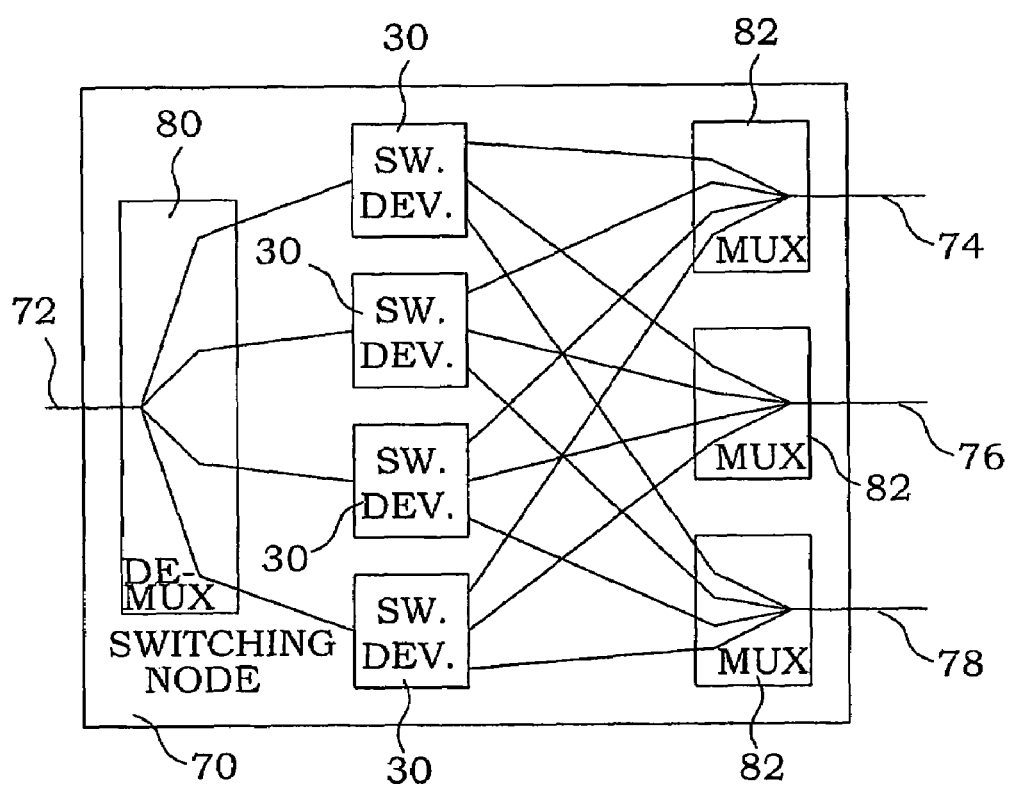
FIG. 7 is a schematic block diagram of an example optical switching device using multiple optical carriers.

Embodiments presented above relate to systems and networks with one optical carrier. However, multi-carrier solutions are also feasible, e.g. WDM-systems. In such systems, demultiplexing of the wavelengths has to be performed before the actual switching occurs. FIG. 7 illustrates an example of a switching node 70 with one in-port 72 and three out-ports 74, 76, 78. The incoming multiwavelength signal, in this case comprising four different optical carriers, is demultiplexed in a demultiplexing device 80 into four branches of unitary wavelength. The different branches are connected to one switching device 30 each, where a switching action according to the earlier discussed principles is performed. The three out-ports of the switching devices are connected to the input terminals on three multiplexing devices 82. In each of the multiplexing devices, the signals of different wavelengths are multiplexed into one common optical signal, which is output at the out-ports 74, 76, 78 of the switching node 70. It can be noted that the add function is not presented in FIG. 7 for the sake of clarity, however, it is easily implemented through switch device 30, as previously described.

It will be understood by those skilled in the art that various modifications and changes may be made to the technology described without departure from the scope thereof, which is defined by the appended claims.

REFERENCES

S. Yao and B. Mukherjee, "Advances in Photonic Packet Switching: an overview", IEEE Communic. Mag., pp. 84-94, February 2000.

D. J. Blumenthal, P. R. Prucnal and J. R. Sauer, "Photonic Packet Switches: Architectures and Experimental implementations" Proceed. IEEE 82 (11), 1650 (1994).

E. Park and A. Willner, "Self-routing of Wavelength Packets using All-Optical Wavelength Shifter and QPSK Sub-carrier Routing Headers" IEEE Photon. Tech. Lett. 8 (7), 938 (1996).

D. Wonglumson, I. M. White, S. M. Gemelos and L. G. Kazovsky, "HORNET—A Packet-Switched WDM Network: Optical Packet Transmission and Recovery" IEEE Photon. Tech. Lett. 11 (12), 1692 (1999).

International patent application WO 00/04668.

U.S. Pat. No. 5,253,250.

U.S. Pat. No. 5,612,806.

The invention claimed is:

1. Method for generating an optical packet, comprising:
   providing an envelope on an optical carrier;
   providing a digital payload signal spanning a frequency baseband;
   generating a predetermined unmodulated frequency tone corresponding to header information;
   said frequency tone being situated within said frequency baseband;
   multiplexing said frequency tone with said digital payload signal to generate a multiplexed signal; and
   modulating said multiplexed signal of said frequency tone and said digital payload signal into said optical carrier envelope.

2. Method for generating an optical packet according to claim 1, characterized in that said envelope is a time frame.

3. Method for generating an optical packet according to claim 1, characterized in that said predetermined frequency tone is indicative of header information of said optical packet.

4. Method for generating an optical packet according to claim 3, characterized in that said header information is an address and/or routing information of said optical packet.

5. Method for generating an optical packet according to claim 4, characterized in that the frequency of said predetermined frequency tone is selected according to preestablished allocation tables.

6. Method for generating an optical packet according to claim 1, characterized in that said predetermined frequency is a radio frequency tone.

7. Method for generating an optical packet according to claim 1, characterized in that said predetermined frequency tone has a combined frequency linewidth and uncertainty smaller than or equal to 10 kHz.

8. An optical packet generator, comprising:
   means for providing an envelope on an optical carrier;
   means for providing a digital payload signal spanning a frequency baseband;
   a frequency tone generator;
   said frequency tone generator being tuned to a first predetermined frequency tone situated within said frequency baseband, said first predetermined frequency tone corresponding to header information;
   a multiplexor connected to said frequency tone generator and said means for providing a digital payload signal and for providing a multiplexed signal of said frequency tone generator and said digital payload signal;
   a modulator connected to said means for providing an envelope and said multiplexor;
   said modulator being arranged for modulating said multiplexed signal of said frequency tone and said digital payload signal into said optical carrier envelope.

9. The optical packet generator according to claim 8, characterized in that said predetermined frequency tone is indicative of header information of said optical packet.

10. The optical packet generator according to claim 9, characterized in that said header information is an address and/or routing information of said optical packet.

11. The optical packet generator according to claim 8, characterized in that said frequency tone generator is a radio-frequency tone generator.

12. The optical packet generator according to claim 8, characterized in that said frequency tone generator gives a frequency output having a combined linewidth and uncertainty less than or equal to 10 kHz.

13. The optical packet generator according to claim 8, characterized by
- a branching device having a number of branch output terminals;
- a multiplexor, connected to said branch output terminals;
- optical delay means provided between said branching device and said multiplexor in at least all branches except one;
- whereby means for providing a digital payload signal, a frequency tone generator and a multiplexor is provided in each branch between said branching device and said multiplexor.

14. The optical packet generator according to claim 13, characterized in that said frequency tone generators are tuned to different frequencies.

15. The optical packet generator according to claim 13, characterized in that said optical delay means have different values of time delay.

16. An optical packet generator, comprising:
- optical signal generation circuitry for providing an envelope on an optical carrier;
- a signal source for providing a digital payload signal spanning a frequency baseband;
- a frequency tone generator tuned to a first predetermined frequency tone situated within said frequency baseband;
- a first multiplexor connected to said frequency tone generator and said signal source and arranged to provide a multiplexed signal of said frequency tone generator and said digital payload signal, said first predetermined frequency tone corresponding to header information; and
- a modulator connected to said optical signal generation circuitry and said first multiplexor;
- said modulator being arranged for modulating said multiplexed signal of said frequency tone and said digital payload signal into said optical carrier envelope.

17. The optical packet generator according to claim 16, characterized in that said predetermined frequency tone is indicative of header information of said optical packet.

18. The optical packet generator according to claim 17, characterized in that said header information is an address and/or routing information of said optical packet.

19. The optical packet generator according to claim 16, characterized in that said frequency tone generator is a radio-frequency tone generator.

20. The optical packet generator according to claim 16, characterized in that said frequency tone generator gives a frequency output having a combined linewidth and uncertainty less than or equal to 10 kHz.

21. The optical packet generator according to claim 16, characterized by
- a branching device having a number of branch output terminals;
- a second multiplexor, connected to said branch output terminals;
- an optical delay provided between said branching device and said multiplexor in at least all branches except one;
- whereby a signal source, a frequency tone generator, and a first multiplexor are provided in each branch between said branching device and said multiplexor.

22. The optical packet generator according to claim 21, characterized in that said frequency tone generators are tuned to different frequencies.

23. The optical packet generator according to claim 21 characterized in that said optical delay includes different values of time delay.

* * * * *